United States Patent [19]

Andrieux et al.

[11] Patent Number: 4,624,686

[45] Date of Patent: Nov. 25, 1986

[54] APPARATUS FOR DEGASSING A LIQUID FLUID

[75] Inventors: Bernard Andrieux; Elisabeth Bourven, both of Boulogne Billancourt; Roger Martin, Fresnes, all of France

[73] Assignee: Delas-Weir, Levallois Perret, France

[21] Appl. No.: 799,995

[22] Filed: Nov. 20, 1985

[30] Foreign Application Priority Data

Nov. 20, 1984 [FR] France ................................ 84 17656

[51] Int. Cl.[4] ................................ B01D 19/00

[52] U.S. Cl. ................................ 55/196; 55/53; 55/256; 261/124; 122/491

[58] Field of Search ..................... 55/53, 54, 196, 198, 55/39, 192–194, 249, 256; 261/DIG. 10, DIG. 32, 124; 122/491

[56] References Cited

U.S. PATENT DOCUMENTS 2,956,784 10/1960 Parkinson ................................ 55/193

3,735,568 5/1973 Beck ................................ 55/256

FOREIGN PATENT DOCUMENTS 0116946 2/1984 European Pat. Off. .

1453078 9/1966 France .

2176157 10/1973 France .

2313131 12/1976 France .

527204 10/1940 United Kingdom .

0536126 4/1975 U.S.S.R. ................................ 55/194

*Primary Examiner*—Charles Hart

*Attorney, Agent, or Firm*—Sughrue, Mion, Zinn, Macpeak, and Seas

[57] ABSTRACT

Apparatus for degassing a liquid fluid, the apparatus being installed inside an envelope (1) which contains a supply (20) of said degassed fluid in the liquid state in the bottom thereof and in equilibrium with its saturated vapor, the apparatus comprising perforated trays (2, 3, 4) situated above the level of the supply and fed with liquid fluid to be degassed, said trays dispersing the liquid and feeding a tank (7) which includes at least one pipe (8) extending therealong in the vicinity of one of its walls (12) and supplied with vapor of said fluid at a pressure P1 which is greater than the pressure P within said envelope, said pipe including a perforated zone (14) running along its entire length inside the tank and on its side adjacent to said wall, said perforated zone serving to fill the bottom portion of the pipe cross-section with liquid from the tank allowing the vapor to escape from said pipe, the apparatus including the improvement whereby said tank is closed (18) betweeen said wall and said pipe, and said wall is provided with at least one spray nozzle (16) along its entire length level with the pipe and above said perforated zone of the pipe.

7 Claims, 4 Drawing Figures

APPARATUS FOR DEGASSING A LIQUID FLUID

The present invention relates to apparatus for degassing a liquid fluid, the apparatus being installed inside an envelope which contains a supply of said degassed fluid in the liquid state in the bottom thereof and in equilibrium with its saturated vapor. The apparatus comprises perforated trays situated above the level of said supply and fed with liquid fluid to be degassed, said trays dispersing the liquid and feeding a tank which includes at least one pipe extending therealong in the vicinity of a corresponding one of its walls and supplied with vapor of said fluid at a pressure P1 which is greater than the pressure P within said envelope. The pipe includes a perforated zone running along its entire length inside the tank and on its side adjacent to said wall, said perforated zone serving to fill the bottom portion of the pipe cross-section with liquid from the tank and allowing the vapor to escape from said pipe.

BACKGROUND OF THE INVENTION

One apparatus of this type is described in French published patent specification No. 2541441. In this prior published French patent specification, the envelope in which the apparatus is installed is constituted by the well of a condenser in an electricity power station. The system described includes two pipes as defined above, one running along one wall of the tank and the other along the opposite wall. In addition, a third pipe fed with vapor at average pressure is situated at a level below said pipes and has vapor escaping therefrom via a row of holes. The top of the tank serves as an overflow from which liquid falls into the condenser well. Clearly in such an application, the fluid is generally $H_2O$, with the liquid and vapor states being constituted by water and steam respectively.

Unfortunately, this prior disposition does not give full satisfaction, and in particular it does not degas the fluid thoroughly enough.

SUMMARY OF THE INVENTION

The present invention provides improved apparatus of the above-defined type for degassing a liquid fluid, the improved apparatus including the improvement whereby the top of said tank is closed between said wall and said pipe, and said wall is provided with at least one spray nozzle running along its entire length level with said pipe and above said perforated zone of the pipe.

In a preferred embodiment of the invention two of said pipes are installed in said tank, one running along one of the walls of the tank and the other running along the opposite wall, with the tank being fed with fluid from said perforated trays via its middle portion situated between said two pipes.

Advantageously, the, or each, spray nozzle is a continuous nozzle.

In a first embodiment, the nozzle is constituted by a longitudinal opening through the wall of the tank, which opening is provided with flexible lips of resilient material.

In a second embodiment, said nozzle is constituted by a longitudinal opening through the wall of the tank, together with means for adjusting the height of said longitudinal opening.

Degassing apparatus as defined above is situated in the well of a condenser in an electricity power station, said envelope being the envelope of the condenser itself, and said trays receiving condensed water falling from the bundles of tubes inside the condenser.

Alternatively, the degassing apparatus may be situated outside the condenser in its own envelope which is fitted with spray nozzles in the top thereof for spraying the fluid to be degassed onto said trays, said envelope including an outlet orifice in the bottom thereof for the degassed liquid fluid, and including orifices in the top thereof which communicate with a source of pressure which is less than the pressure inside the envelope, with the uncondensable gases escaping via said orifices through the top of the envelope.

BRIEF DESCRIPTION OF THE DRAWINGS

Embodiments of the invention are described by way of example with reference to the accompanying drawings, in which.

MORE DETAILED DESCRIPTION

Figure 1:
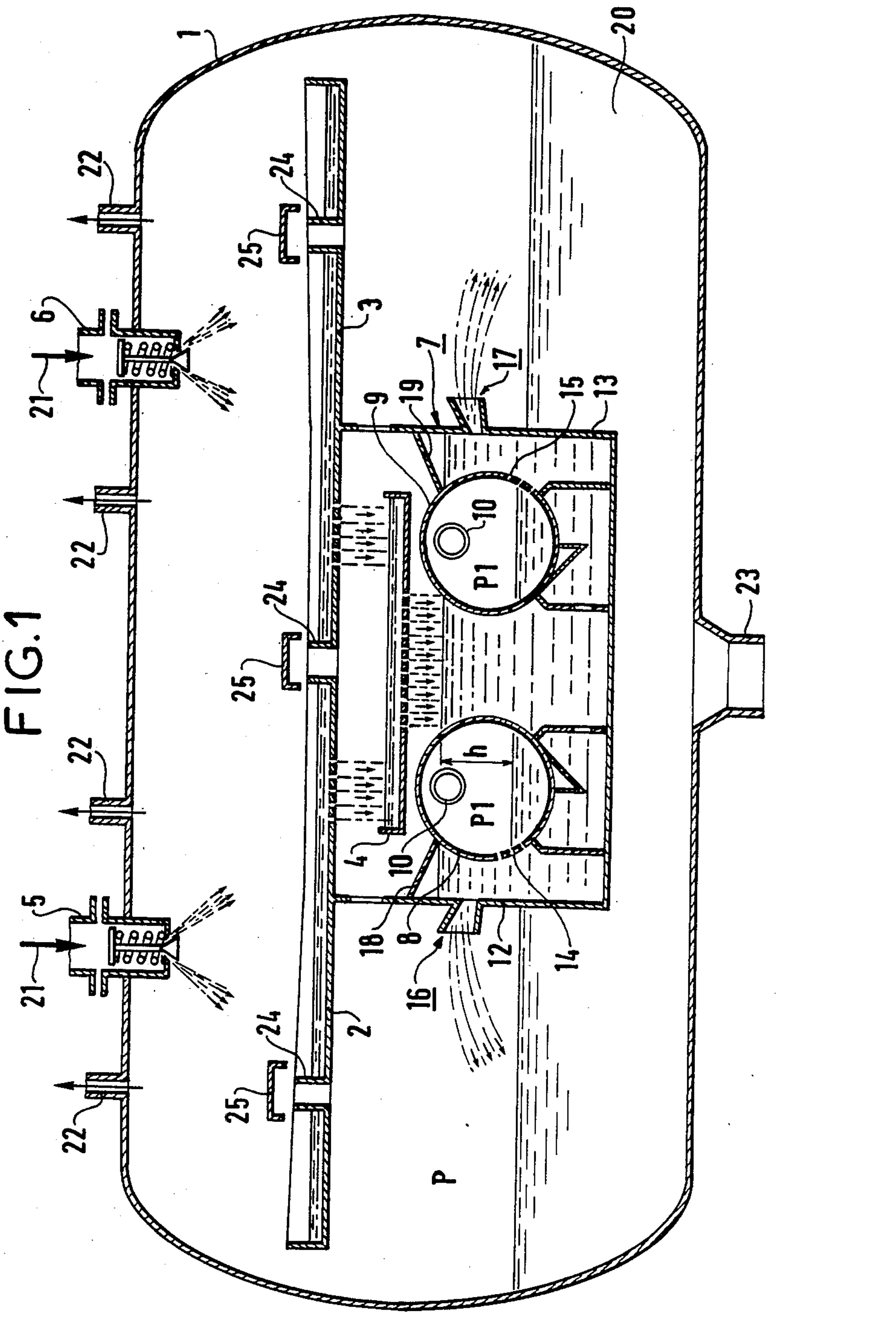
FIG. 1 is a section through degassing apparatus in accordance with the invention.
Figure 2:
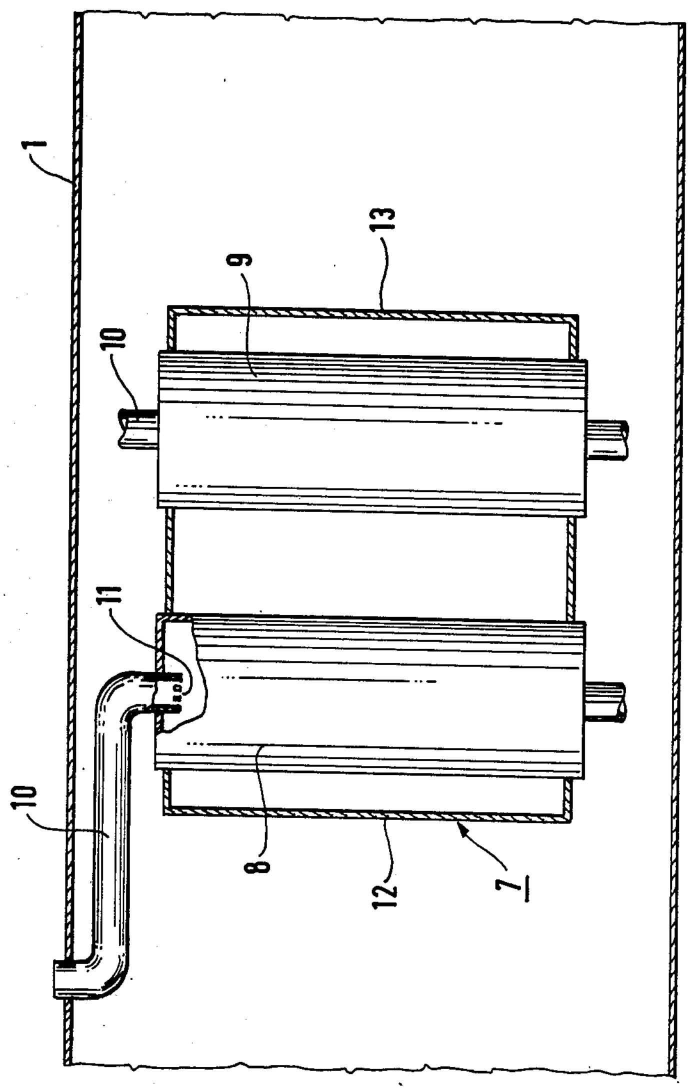
FIG. 2 is a plan view of a portion of the apparatus shown in FIG. 1.

With reference to FIGS. 1 and 2, the degassing apparatus shown comprises an outer envelope 1, containing perforated plates 2, 3, and 4 which receive water to be degassed coming from spray nozzles 5 and 6. The perforated plates serve to disperse the water and to feed a tank 7.

Two horizontal pipes 8 and 9 are disposed inside the tank 7 and are fed with steam having the same composition as the water to be degassed, said steam being fed via ducts 10 and via a pressure-reducing diaphragm such as 11. The pipes 8 and 9 are disposed in parallel adjacent to two respective opposite walls 12 and 13 of the tank 7.

A perforated zone runs along each of the pipes 8 and 9 facing the adjacent tank wall 12 or 13 as the case may be. The pipe 8 has a perforated zone 14 and the pipe 9 has a perforated zone 15. Each of the walls 12 and 13 includes a continuous spray nozzle 16 or 17 as the case may be running along its entire length and disposed at a level which is slightly above the level of the corresponding perforated zone 14 or 15. The top of the tank 7 is closed between the wall 12 and the pipe 8 by a wall 18, and also between the wall 13 and the pipe 9 by a wall 19. The tank 7 is fed with water falling from the perforated plate 4 which is located in the middle thereof between the pipes 8 and 9.

The bottom of the envelope 1 contains degassed water 20. This proportion of the envelope is fed via the nozzles 16 and 17 and constitutes a supply above which the pressure is P and is due to the saturated water vapor pressure from the degassed water 20 together with the partial pressure of uncondensable gases (e.g. oxygen) extracted by the apparatus from the feed water arriving at 21. Orifices 22 connected to a source of pressure which is less than the pressure P serve to extract the uncondensable gases.

The bottom of the envelope 1 includes an outlet orifice 23 connected to the feed circuit of the power station boiler.

The pressure P1 of the steam fed into the pipes 8 and 9 is greater than the pressure P inside the envelope 1. This pressure difference corresponds to a height h of water between the level of the water in the tank 7 and the level of the water in the pipes 8 and 9 which fill partially with water via the perforations 14 and 15.

Operation is as follows:

Water to be degassed arrives via the nozzles 5 and 6 and is sprayed over the plates 2 and 3, and is thereby subjected to a first reheating operation which continues until the water falls into the tank 7 via the perforated trays 2, 3 and 4 which serve to disperse the water and which encourage reheating thereof to a temperature close to the saturation temperature of the water 20.

The water as reheated in this way is mixed with the steam leaving via the perforations 14 and 15 of the pipes 8 and 9, and the resulting mixture exits at high speed via the spray nozzles 16 and 17 thereby providing a perfect water/steam emulsion.

This emulsion serves to expel the uncondensable gases contained in the water. These gases escape via the orifices 22.

In order to enable the uncondensable gases to escape freely, the trays are provided with chimnies 24 which are covered with caps 25 so as to avoid the feed water 21 passing directly through the trays via the chimnies.

Figure 3:
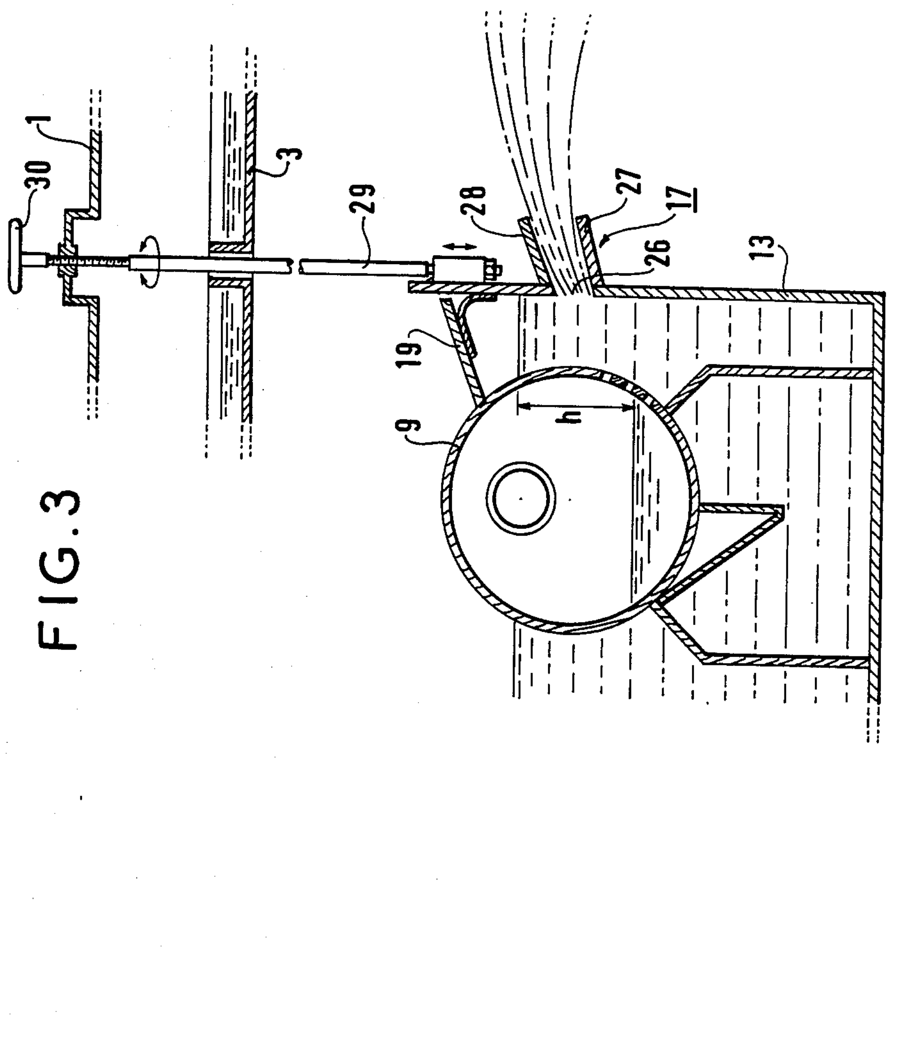
FIG. 3 shows a detail of FIG. 1.

In order to obtain a desired outlet speed through the nozzles 16 and 17, the nozzles may be adjusted as the desired liquid flow rate. FIG. 3 shows one such adjustment device. The nozzle 17 comprises a longitudinal opening 26 having lips 27 and 28. The top of the wall 13 of the tank 7 mounting lip 28 is connected to a rod 29 whose top end is threaded and is terminated by an operating wheel 30 enabling the height of the opening 26 to be adjusted.

Figure 4:
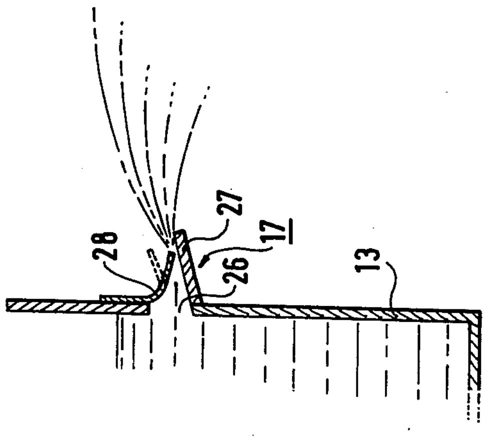
FIG. 4 shows a variant of the detail shown in FIG. 3.

It is also possible to make a nozzle which adjusts itself automatically, as shown in the FIG. 4 variant. The top lip 28 is constituted by one or more flexible sheets of resilient material, e.g. stainless steel or strips of rubber.

The apparatus as described above, i.e. the set of trays 2, 3, 4, the tank 7, and the pipes 8 and 9 may also be installed in the well of a condenser in an electricity power station.

The outer envelope 1 is then constituted by the envelope of the condenser itself, and the perforated trays 2 and 3 then receive condensed water falling directly from the bundles of tubes in the condenser, in exactly the same manner as described in the above-mentioned French patent specification No. 2541441.

Compared with said prior document, the present invention considerably improves degassing by virtue of the spray nozzles 16 and 17 and by closing the tank 7 by means of the walls 18 and 19 extending between each pipe and the adjacent wall of the tank.

There follows a numerical example which should not be taken as being limiting. The water to be degassed when input at 21 is at a temperature of 27.9° C. and flows at a rate of 2050 (metric) tons per hour (both nozzles 5 and 6 combined). At the outlet 23 the degassed water is at 31° C. Inside the pipes 8 and 9, steam is at a pressure P1 of 60 millibars and it is at 150° C. These pipes are fed via ducts 10 by steam at 12 bars and at 188° C., which steam may be bled off at a total rate of 15 (metric) tons per hour for both ducts 10. This steam thus expands from 12 bars to 60 millibars via the diaphragm 11. Finally, inside the envelope 1, i.e. inside the degassing apparatus or inside the well of the condenser if the apparatus is installed inside a condenser, the pressure P is 40 millibars. There is thus a pressure difference of 20 millibars between the pressure P and the pressure P1 and this corresponds to a height h equal to 20 cm.

These values are given for a 900 MW power station operating at its nominal rating and having two complete systems of the type shown in FIG. 1.

The above worked example is not limiting and numerous other values could be devised. Similarly, the invention is applicable to fluids other than water and to applications other than electricity power stations.

We claim:

1. In an apparatus for degassing a liquid fluid installable in an envelope which contains a supply of said degassed fluid in a liquid state in the bottom thereof and in equilibrium with its saturated vapor, said apparatus comprising;

a tank, perforated trays mounted on said tank and for being situated above the level of said supply and for being fed with liquid fluid to be degassed, said trays dispersing the liquid and feeding said tank, said tank including at least one pipe extending therealong in the vicinity of one of its walls and for being supplied with vapor of said fluid at a pressure P1 which is greater than the pressure P within said envelope, said pipe including a perforated zone running along its entire length inside the tank and on its side adjacent to said wall, said perforated zone serving to fill the bottom portion of the pipe cross-section with liquid from the tank and allowing the vapor to escape from said pipe, the improvement whereby the top of said tank is closed between said wall and said pipe, and said wall is provided with at least one spray nozzle along its entire length level with the pipe and above said perforated zone of the pipe.

2. Degassing apparatus according to claim 1, wherein said tank includes opposed walls, said at least one pipe consists of two pipes installed in said tank, one pipe runs along one of the walls of the tank and the other pipe runs along the opposite wall, and the tank is fed by liquid from a portion of said perforated plates situated between two pipes.

3. Degassing apparatus according to claim 1, wherein said spray nozzle is a continuous nozzle.

4. Degassing apparatus according to claim 3, wherein said nozzle is formed by a longitudinal opening through said tank wall, which opening is fitted with at least one flexible lip of resilient material.

5. Degassing apparatus according to claim 3, wherein said nozzle is constituted by a longitudinal opening through said tank wall, and means for adjusting the height of said opening.

6. Degassing apparatus according to claim 1, wherein the apparatus is situated in the condenser well of an electricity power station, said envelope being the envelope of the condenser itself such that said trays receive condensed water from the condenser.

7. Degassing apparatus according to claim 1, wherein said envelope includes nozzles in the top thereof for spraying fluid to be degassed to feed said trays, the bottom of said envelope including an outer orifice for degassed liquid fluid, and the top of said envelope including outlet orifices communicating with a source of pressure which is less than the pressure P within said envelope and via which the uncondensable gases escape.

* * * * *